Sept. 18, 1962  J. L. HENSLEY  3,054,224
CUTTING MACHINES
Filed Sept. 2, 1959  5 Sheets-Sheet 1

INVENTOR
JAMES L. HENSLEY,

BY
ATTORNEYS

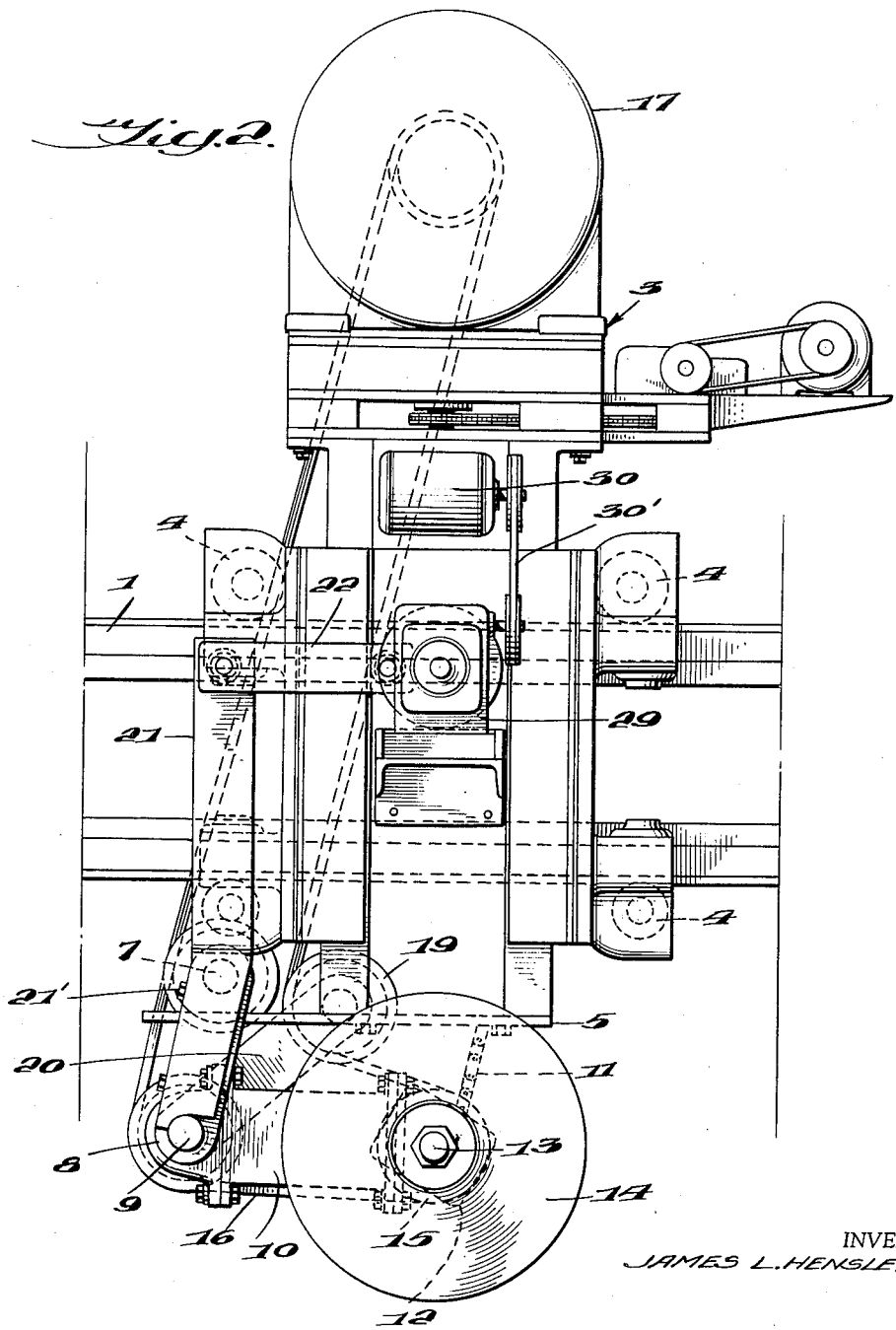

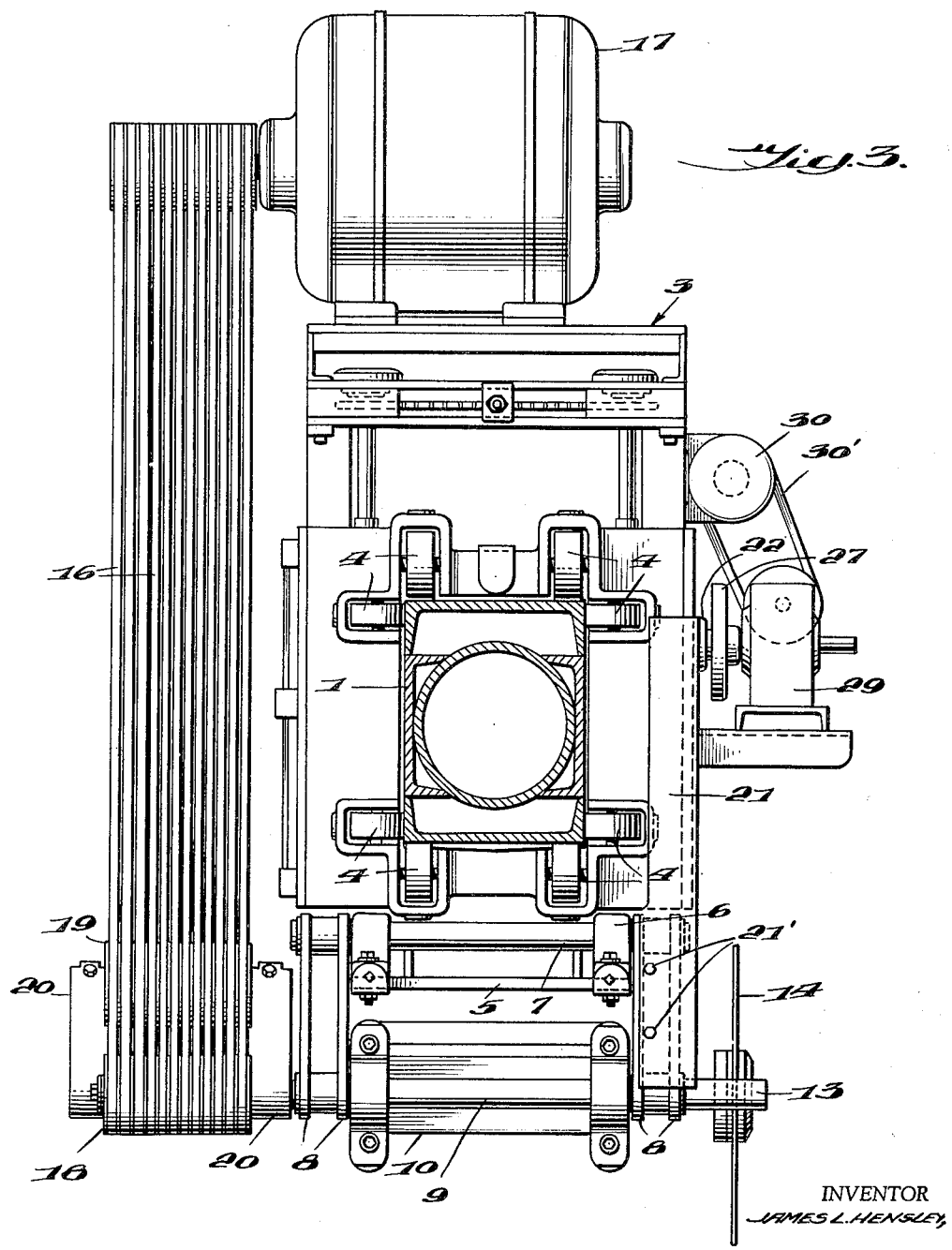

Sept. 18, 1962   J. L. HENSLEY   3,054,224
CUTTING MACHINES
Filed Sept. 2, 1959   5 Sheets-Sheet 4
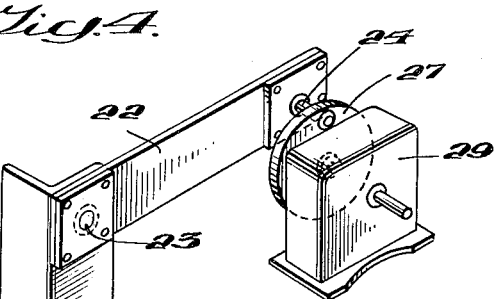
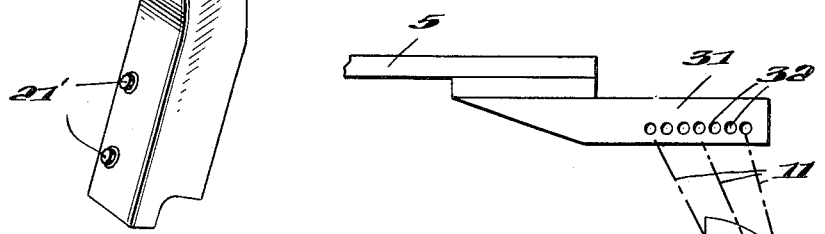
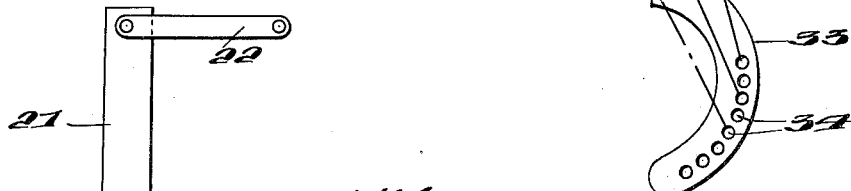
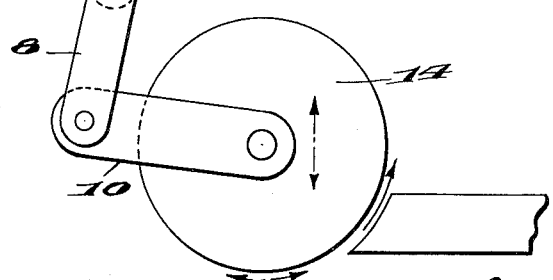
INVENTOR
JAMES L. HENSLEY,
BY
ATTORNEYS Sept. 18, 1962
J. L. HENSLEY
3,054,224
CUTTING MACHINES
Filed Sept. 2, 1959
5 Sheets-Sheet 5
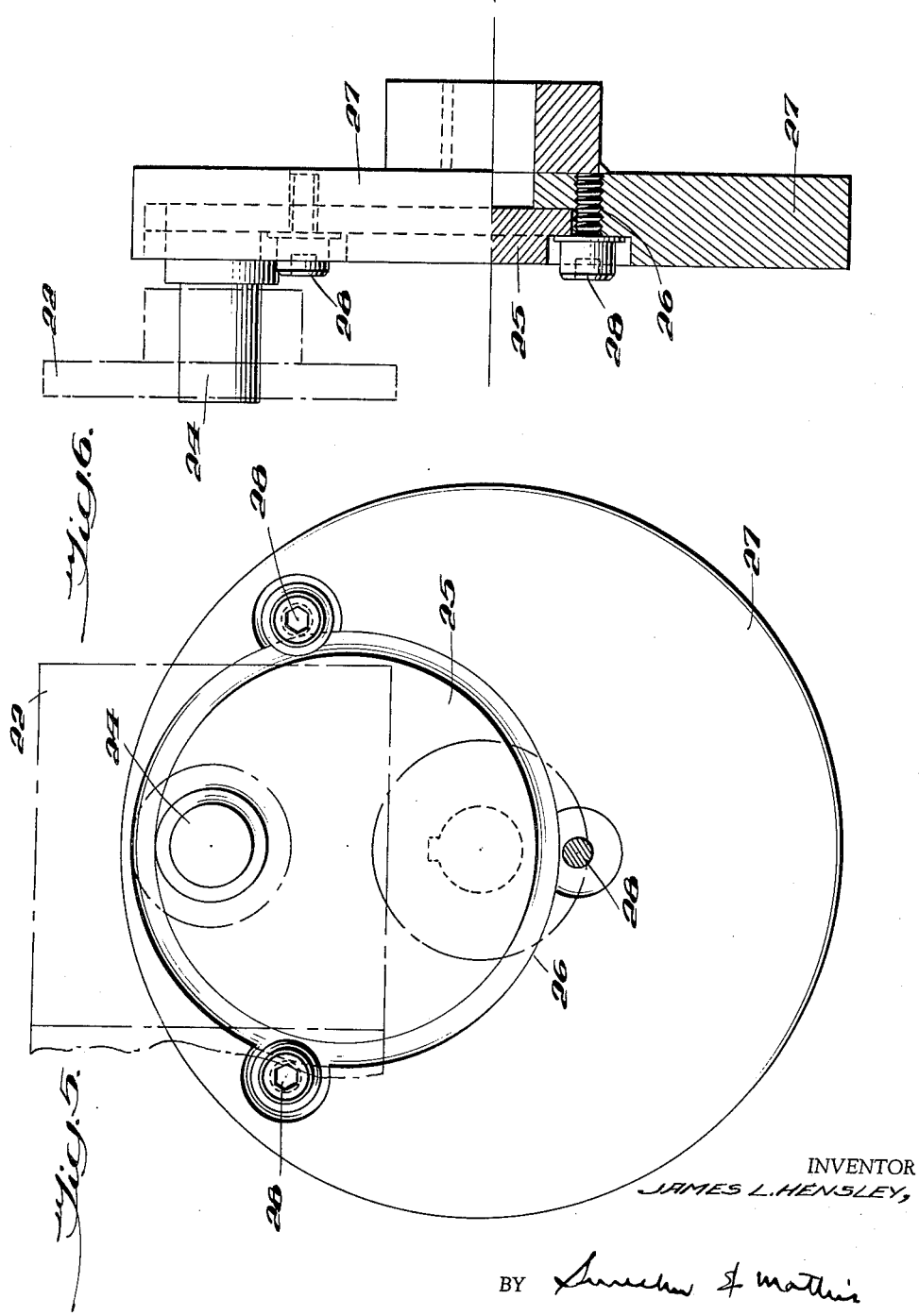
INVENTOR
JAMES L. HENSLEY,
BY
ATTORNEYS

United States Patent Office 3,054,224
Patented Sept. 18, 1962

3,054,224
CUTTING MACHINES
James L. Hensley, Clinton, Tenn., assignor to Ty-Sa-Man Machine Company, Knoxville, Tenn., a corporation of Tennessee
Filed Sept. 2, 1959, Ser. No. 837,708
7 Claims. (Cl. 51—33)

This application is a continuation-in-part of my prior application, filed August 7, 1958, Serial No. 753,687.

This invention relates to improvements in cutting machines which will produce a bodily linear movement of the tool with respect to the work.

It has been proposed and provided heretofore for operating cutting tools that move over the surface of the work, either parallel with the surface or at right angles thereto. It is often desirable, however, to provide for more universal operation and to effect movement of the tool with respect to the work in different angular directions, but no satisfactory and practical machine has been provided heretofore that would fulfill these requirements.

One object of the invention is to provide for universal operation of the tool with respect to the work, not only along the surface or at a right angle thereto, but also at different angular directions relative to the surface of the work.

Another object of the invention is to provide for operation of the tool through and at an angle to the plane of the work in an arcuate direction which would facilitate the cutting operation and action of the tool on the work.

Still another object of the invention is to simplify and improve machines which will provide for universal action of a tool in applying a surfacing or cutting action to an object in order to effect the desired action thereon.

These objects may be accomplished, according to one embodiment of the invention, by suspending the arbor carrying the work tool, either a cutter or a grinding tool, for bodily swinging movement in a compound flexible leverage action which may be varied to effect movement of the tool in different directions with respect to the work. Thus, the tool can be directed upwardly at an angle, which may be an arcuate direction, or along the surface of the work, or substantially vertically relative thereto, according to the action desired.

According to this embodiment, the arbor is supported on a swinging frame carried by a pivoted linkage in such relation that rocking movement of the frame may be effected and the direction of rocking movement controlled so as to give the desired action to the tool that is mounted on the arbor. Provision is made through power means operatively connected with the suspending linkage to effect the desired rocking movement to the tool.

This embodiment of the invention is illustrated in the accompanying drawings, in which:

FIG. 2 is a side elevation thereof;

FIG. 3 is a view at right angles to FIG. 2 and with a part in section;

FIG. 4 is a detail perspective view of the oscillating assembly;

FIG. 5 is a face view of the operating cam therefor;

FIG. 6 is a partial sectional view thereof;

FIG. 7 is a detail view of the adjusting means for the swinging frame; and

FIG. 8 is a diagrammatic view, showing the action of the tool.

Figure 1:
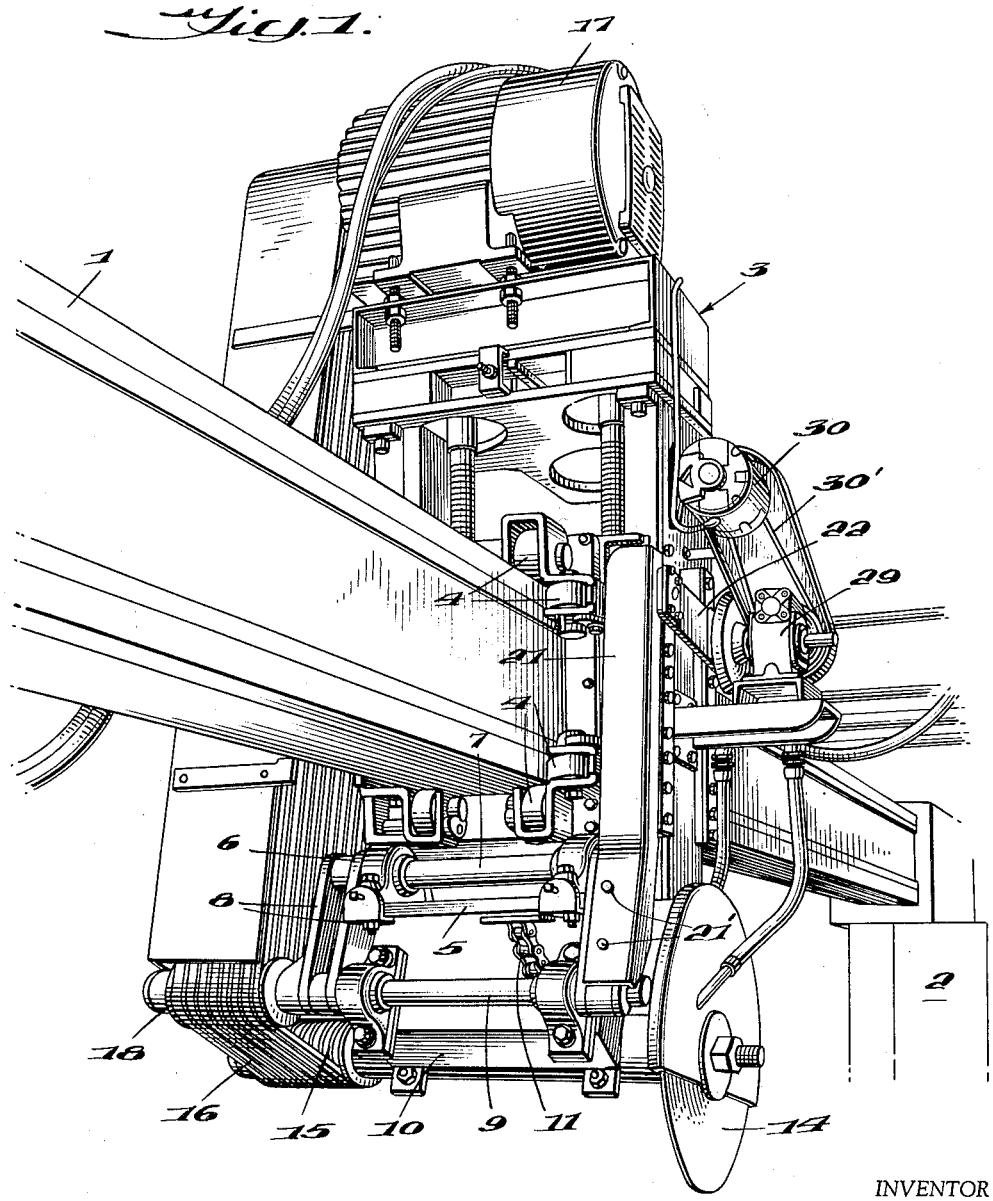
FIG. 1 is a perspective view of a portion of the machine to which the invention is applied.

In the embodiment shown in the drawings, the cutting or surfacing unit is illustrated as adapted to be supported and mounted on a rail, generally indicated by the numeral 1, which may extend along or over the table or other surface on which the work would be supported. The rail 1 is adapted to be supported at its opposite ends, as indicated generally at 2 in FIG. 1, to support the rail in an elevated position with respect to the work, as described more in detail in my prior application, Serial No. 753,687.

Operatively mounted on the rail 1, for movement lengthwise thereof, is a suitable carriage structure, generally indicated at 3, having rollers 4 journaled in the carriage 3 and mounted in guiding relation with the rail 1. Any suitable means may be used for traversing the carriage 3 along the rail 1, such as that described in the aforesaid application.

The carriage 3 includes a supporting plate 5 secured in any suitable manner to the structure of the carriage at the lower portion thereof. Bearing boxes are shown at 6 as supported upon the plate 5 or other suitable part of the carriage 3 within which bearing boxes a shaft 7 is mounted. The shaft 7 extends transversely substantially from side-to-side of the carriage 3, as illustrated in FIG. 3, projecting outwardly from the respective bearing boxes 6 at its opposite ends.

Mounted on the opposite end portions of the shaft 7 are pairs of links 8, which links 8 depend from the ends of the shaft 7, as illustrated in FIG. 2. The lower ends of the links 8 have a cross shaft 9 mounted thereon and journaled for movement relative to the links 8.

A swinging frame is shown at 10, which frame 10 may be in the form of a skeleton frame, casting or of other suitable structure which will be effective for the purpose. One end of the frame 10 is journaled on the cross shaft 9 for upward and downward swinging movement relative to the links 8, while the opposite end of the swinging frame is suspended by a flexible device, generally indicated at 11 from the adjacent portion of the plate 5. Thus, the frame is mounted on the links 8 and the flexible device 11 for oscillating movement in a generally horizontal or upwardly inclined direction and substantially vertical movement may also be possible, if desired.

The forward end of the swinging frame 10 has journal boxes 12 supported thereon within which an arbor 13 is journaled, said arbor projecting through opposite sides of the swinging frame 10, for rotary movement relative thereto.

One end of the arbor 13 has a tool 14 mounted thereon. When cutting action of the work is desired, the tool 14 would be in the form of a saw of any suitable character, according to the work on which it is to operate.

On the other hand, when surfacing action is to be performed on the work, the tool would be of a suitable character such, for example, as a grinding wheel, to effect the desired operation.

At the opposite end of the arbor 13, a series of drive pulleys 15 are mounted over which belts 16 extend from the drive shaft of a motor 17 mounted on the carriage 3. An electric motor or other suitable drive means may be used for this purpose, to effect rotation of the arbor 13 usually at high speed.

In the form of driving means illustrated in the drawings, the belts 16 extend over guide pulleys 18 on a projecting end of the shaft 9, thence around the pulleys 15 and around idler pulleys 19 which deflect intermediate portions of the belts, as shown in FIG. 2. The idler pulleys 19 are supported and held in parallel spaced relation with respect to the shaft 9 by a pair of link members 20, each of which is anchored at one end to the shaft 9 on opposite sides of the pulleys 18, and at the opposite end to the shaft supporting the pulleys 19. This effects the desired gripping and driving relation of the belts with the pulleys on the arbor, to assure of high speed operation of the latter and of the tool 14.

Provision is made for imparting the desired rocking movement to the links 8, so as to effect the proper oscillating movement to the arbor. It is preferred that this rocking motion be accomplished by key connection of the links 8 with the shaft 7, so that both pairs of links 8 are in parallel relation to each other and whereby, upon turning movement of the shaft 7, a rocking movement is imparted to the links 8, thereby oscillating the arbor. In this embodiment, the motion is accomplished by an arm 21 secured in any suitable manner as, for example, by bolts 21' to one pair of links 8. The arm 21 extends upwardly from the links in the manner illustrated in FIGS. 2, 3 and 4.

At its upper end, the arm 21 has a plate link 22 extending laterally therefrom, which plate link 22 is pivotally connected with the arm 21 at 23. The plate link 22 extends transversely beside the carriage 3 to a point substantially intermediate the width of the carriage, as indicated in FIG. 2.

At its end opposite from the arm 21, the plate link 22 has a wrist pin 24 journaled therein (see FIGS. 4, 5 and 6). The wrist pin 24 is anchored in a recess 26 in a crank pin plate 25 mounted in a recess 26 in one side of a head plate 27. The plate 25 is held in adjusted positions with respect to the head plate 27 by clamping screws or bolts 28, three of which are shown spaced apart circumferentially around the recess 26. When these bolts 28 are loosened, the crank pin plate 25 may be turned circumferentially to the head plate 27 to vary the length of throw of the crank pin 24 from a position where the crank pin is coaxial with the head plate 27 to its maximum position of throw with the parts shown in FIGS. 5 and 6. Then, when the bolts 28 are tightened, the crank pin plate 25 is locked in fixed relation to the head plate 27 and held in that position during operation of the machine. This adjustment of the crank pin plate 25 and wrist pin 24 will adjust the stroke and thereby the swing of the arbor carrying the tool.

Also in this embodiment, the head plate 27 is rotated by suitable power means as, for example, speed reducing gearing, generally indicated at 29, which is driven from a motor 30 mounted on the carriage 3, as shown in FIGS. 2 and 3, through a belt 30'.

It will be evident that the arbor 13 is driven continuously during operation of the machine and thereby effects continuous rotation of the tool 14. At the same time, through the operating mechanism just described and illustrated in FIGS. 4 to 6, the swinging frame 10 carrying the arbor is moved bodily forward and backward in a generally horizontal direction by the rocking motion of the links 8. The degree of this swinging movement may be varied by the adjustment illustrated at 24—28.

The rocking movements of the swinging frame 10 is about fixed centers in the shafts 7 and 9, so that the direction of rocking movement may be controlled by varying the length of the flexible device 11 which suspends the free end of the swinging frame 10 from the bottom portion of the carriage 3. Thus, if the flexible device 11 is very short, the swinging frame 10 will be tilted upward and the movement of the axis of the tool will be more in an upwardly arcuate direction, as illustrated diagrammatically in FIG. 8. On the other hand, upon downward lengthening of the flexible device, the axis of the tool will be moved, so as to transcend a more nearly horizontal direction during the oscillating movement of the arbor. Thus, the same machine may effectively serve different types of oscillating movements of the tool, according to the desire of the user thereof. Such variations are indicated generally in that diagrammatic view by the full line and dotted line arrows illustrated therein, and many other variations are possible, according to the adjustments which can be effected of this mechanism.

If desired, the length of the flexible device 11 can be fixed during the initial construction and setting up of the machine. It is also capable of effecting such adjustments during service and use as, for example, as illustrated in FIG. 7. Different positions of the flexible device 11 are illustrated in FIG. 7 by dotted lines, to show variations in the disposition of this device for effecting different types of movements. These adjustments in service may be accomplished by the user by providing on the bottom plate 5 a hanger 31 having a series of holes 32 therein for selective engagement with one end of the flexible device 11. A pair of segments 33 are secured, in turn, to the bearing blocks 12, and these segments also have a series of holes 34 therein for attachment of the opposite end of the flexible device 11 thereto. A sprocket chain or other suitable means has been found effective and suitable for suspending the arbor and may be adjusted in the respects mentioned.

While the invention has been illustrated and described in one embodiment, it is recognized that variations and changes may be made therein without departing from the invention as set forth in the claims.

I claim:

1. In a machine of the character described, the combination of a supporting frame, an arbor adapted to support a cutting tool for rotary motion, an upright flexible device connected at one end with the arbor and having its opposite end fixed to a support on the frame and supporting the arbor for substantially horizontal movement, a swinging frame connected at one end with the arbor and extending substantially horizontally therefrom, upright linkage supporting the other end of the swinging frame, a pivotal support for the linkage having the linkage extending downwardly therefrom, power means operatively connected with the linkage for causing oscillatory movement of the arbor, and drive means for the arbor extending lengthwise of the linkage and swinging frame.

2. In a machine of the character described, the combination of a supporting frame, an arbor adapted to support a cutting tool for rotary motion, an upright flexible device connected at one end with the arbor and having its opposite end fixed to a support on the frame and supporting the arbor for substantially horizontal movement, a swinging frame connected at one end with the arbor and extending substantially horizontally therefrom, upright linkage supporting the other end of the swinging frame, a pivotal support for the linkage having the linkage extending downwardly therefrom, a lever fixedly connected with the linkage, crank means operatively connected with the lever for imparting swinging movement to the linkage and swinging frame, and drive means for the arbor.

3. In a machine of the character described, the combination of a supporting frame, an arbor adapted to support a cutting tool for rotary motion, an upright flexible device connected at one end with the arbor and having its opposite end fixed to a support on the frame and supporting the arbor, a swinging frame connected at one end with the arbor and extending approximately horizontally therefrom, a pivot shaft on the supporting frame, a link extending in an upright direction from the last-mentioned end of the swinging frame to said pivot shaft and supported thereon, a second shaft pivotally connecting the upright link with the swinging frame, power means connected with the link for moving the swinging frame horizontally, and power drive means for the arbor including an endless device having runs on respectively opposite sides of the shafts.

4. In a machine of the character described, the combination of a supporting frame, an arbor adapted to support a cutting tool for rotary motion, power means for operating the arbor, a substantially horizontal frame having the arbor mounted on one end thereof, upright linkage having a supporting pivotal connection with the other end portion of the horizontal frame, means for applying a rocking movement to the linkage and an approximately horizontal movement to the horizontal frame, and additional means connected with the supporting frame and with the first-mentioned end of the horizontal frame for directing the arbor bodily upward in an arc during said approximately horizontal movement, and means forming a driving connection from the power means to the arbor around the outside of the pivotal connection coaxial therewith.

5. In a machine of the character described, the combination of a supporting frame, an arbor adapted to support a cutting tool for rotary motion, a substantially horizontal frame having the arbor mounted on one end thereof, upright linkage having a pivotal connection with the other end of the frame, an upright flexible device connected with the first-mentioned end of the horizontal frame and supporting said arbor, power means operatively connected with the upright linkage for oscillating the horizontal frame in a generally horizontal direction under control of pendulum swinging action of the upright flexible device, power driving means mounted on the supporting frame, and means forming a flexible driving connection from said power means to the arbor and extending around the linkage pivotal connection with the horizontal frame.

6. In a machine of the character described, the combination of a supporting frame, an arbor adapted to support a cutting tool for rotary motion, a substantially horizontal frame having the arbor mounted on one end thereof, upright linkage having a pivotal connection with the other end of the frame, an upright flexible device connected with the first-mentioned end of the horizontal frame and supporting said arbor, power means operatively connected with the upright linkage for oscillating the horizontal frame in a generally horizontal direction under control of pendulum swinging action of the upright flexible device, power driving means on the supporting frame, an endless device extending from said power driving means to the arbor, and means for driving said endless device located symmetrically on opposite sides of the linkage pivotal connection.

7. In a machine of the character described, the combination of a supporting frame, an arbor adapted to support a cutting tool for rotary motion, an elongated swinging frame having the arbor mounted on one end thereof, linkage connected with the other end of the swinging frame and disposed in an upright direction at an acute angle to a vertical plane, a non-extensible device connected with the supporting frame and with the first-mentioned end of the swinging frame and supporting said swinging frame for rocking movement, power means for applying rectilinear movement to the swinging frame and moving the linkage across said vertical plane.

References Cited in the file of this patent
UNITED STATES PATENTS

| | | |
|---|---|---|
| 462,394 | Cameron | Nov. 3, 1891 |
| 2,214,141 | Mall | Sept. 10, 1940 |
| 2,482,934 | Rainbolt et al. | Sept. 27, 1949 |
| 2,583,758 | Webber | Jan. 29, 1952 |
| 2,807,123 | Palmer | Sept. 24, 1957 |
| 2,855,733 | Allison | Oct. 14, 1958 |